United States Patent
Muller et al.

(10) Patent No.: US 10,048,042 B2
(45) Date of Patent: Aug. 14, 2018

(54) ADAPTIVE MASKING METHOD AND DEVICE

(71) Applicant: NEXTER SYSTEMS, Roanne (FR)

(72) Inventors: Sylvain Muller, St. Germain de la Grange (FR); Eric Petitpas, La Celle les Bordes (FR)

(73) Assignee: NEXTER SYSTEMS, Roanne (FR)

( * ) Notice: Subject to any disclaimer, the term of this patent is extended or adjusted under 35 U.S.C. 154(b) by 292 days.

(21) Appl. No.: 14/888,830

(22) PCT Filed: May 2, 2014

(86) PCT No.: PCT/FR2014/051049
§ 371 (c)(1),
(2) Date: Nov. 3, 2015

(87) PCT Pub. No.: WO2014/177818
PCT Pub. Date: Nov. 6, 2014

(65) Prior Publication Data
US 2016/0076855 A1     Mar. 17, 2016

(30) Foreign Application Priority Data

May 3, 2013 (FR) ..................... 13 01053

(51) Int. Cl.
*F41H 3/02* (2006.01)
*F41H 3/00* (2006.01)
(Continued)

(52) U.S. Cl.
CPC ............... *F41H 3/02* (2013.01); *F41H 3/00* (2013.01); *H04N 5/265* (2013.01); *H04N 7/18* (2013.01)

(58) Field of Classification Search
CPC .. F41H 3/02; F41H 3/00; H04N 5/265; H04N 7/18
See application file for complete search history.

(56) References Cited

U.S. PATENT DOCUMENTS 6,466,254 B1 * 10/2002 Furlan .................. H04N 5/2259
348/36
6,927,724 B2   8/2005 Snaper
(Continued)

FOREIGN PATENT DOCUMENTS

DE   10 2005 044404 A1   3/2007
DE   10 2008 033464 A1   1/2010
(Continued)

OTHER PUBLICATIONS

Jul. 1, 2014 Search Report issued in International Patent Application No. PCT/FR2014/051049.
(Continued)

*Primary Examiner* — Thai Tran
*Assistant Examiner* — Christopher T Braniff
(74) *Attorney, Agent, or Firm* — Oliff PLC

(57) ABSTRACT

An adaptive masking method for an element in a field of operations. According to this method, at least one cover allowing to cover the element is implemented, the cover carrying at least one image generator network connected to an image synthesizer coupled to a camera. According to this method, the camera is positioned so as to cover both a portion of a background of the element and the entire cover, the image synthesizer controlling the at least one image generator network so as to minimize the contrast and optionally the frequency deviation between the background and the cover. The device implementing such a method is described.

11 Claims, 3 Drawing Sheets

Figure 1:
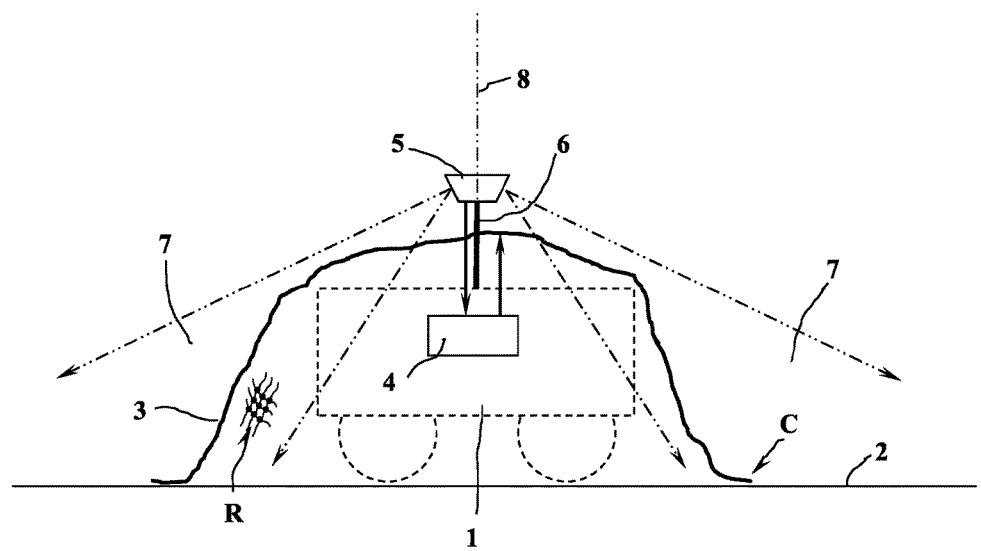

(51) Int. Cl.
*H04N 5/265* (2006.01)
*H04N 7/18* (2006.01)

(56) References Cited

U.S. PATENT DOCUMENTS

| | | | |
|---|---|---|---|
| 9,175,930 | B1 | 11/2015 | Pezeshkian et al. |
| 2002/0117605 | A1* | 8/2002 | Alden ........................ F41H 3/00 250/208.1 |
| 2005/0052310 | A1 | 3/2005 | Snaper |
| 2007/0190368 | A1 | 8/2007 | Jung et al. |
| 2010/0207025 | A1* | 8/2010 | Meir ........................ F41H 3/00 250/330 |
| 2012/0154196 | A1 | 6/2012 | Cincotti et al. |
| 2014/0002884 | A1 | 1/2014 | Marcel et al. |

FOREIGN PATENT DOCUMENTS

| | | |
|---|---|---|
| FR | 2 969 323 A1 | 6/2012 |
| GB | 2 362 283 A | 11/2001 |
| GB | 2 369 421 A | 5/2002 |
| WO | 03/030099 A2 | 4/2003 |
| WO | 2004/074911 A2 | 9/2004 |
| WO | 2010/093323 A1 | 8/2010 |
| WO | 2012/169954 A1 | 12/2012 |

OTHER PUBLICATIONS

Jul. 1, 2014 Written Opinion issued in International Patent Application No. PCT/FR2014/051049.

Nick Brown, "Hidden agenda: camouflage systems take a leaf out of science fiction", Jane's International Defence Review, Jane's Information Group, Coulsdon, Surrey, GB, vol. 44, no. Mar. 1, 2011, pp. 62-65, ISSN: 1476-2129.

* cited by examiner

ADAPTIVE MASKING METHOD AND DEVICE

The technical field of the invention is that of adaptive masking methods and devices for elements on a field of operations.

According to the present invention, "element" will mean an object, a vehicle or a person.

It is already known to use adaptive masking devices which associate an emitting masking cover and a camera. Patents DE102008033464 and GB2369421 thus describe a flexible screen formed by organic light-emitting diodes (known by the acronym OLED). This screen is coupled to a camera which observes the background and controls the diodes so as to cause an image of this background to be displayed on the screen.

One of the disadvantages of this known device is that the image thus provided ensures a masking only in a direction which is substantially the direction of observation of the camera.

When the observer looks at the masked object in a different direction, the object is no longer mistaken with its background and it can be detected.

It is also known, by patent WO200330099, to define a masking means allowing to correct this problem related to the directions of observation. However, the solution suggested is very complex and implements multi-direction light sensors as well as means for emitting along several directions and providing different images along the different directions of observation.

The invention aims to provide a masking method as well as the associated device which implement means which are technically simple, the method and device however ensuring an improved masking with respect to the background.

Thus, the invention relates to an adaptive masking method for an element in a field of operations, method in which at least one cover allowing to cover the element is implemented, the cover carrying at least one image generator network, the network being connected to an image synthesizer coupled to a camera, method in which the camera is positioned so as to cover both a portion of the background of the element and the entire cover, the image synthesizer controlling the at least one image generator network so as to minimize the contrast and optionally the frequency deviation between the background and the cover.

According to a particular embodiment, in order to minimize the contrast and optionally the frequency deviation between the background and the cover, the outline of the cover could be determined beforehand, the image synthesizer continuously comparing the contrast and optionally the frequency on either side of the outline so as to control the images provided by the at least one generator network, in contrast and optionally in frequency, within the outline.

The outline could be determined when placing the cover, by setting all the image generators to a reference value.

The images captured by the camera and generated by the synthesizer could be within the visible and/or infrared spectrum.

The invention also relates to an adaptive masking device for an element in a field of operation, the device comprising at least one cover allowing to cover the element, the cover carrying at least one image generator network, the network being connected to an image synthesizer coupled to a camera, the device being characterized in that the camera is positioned so as to cover both a portion of a background of the element and the entire cover, the image synthesizer controlling the at least one image generator network so as to minimize the contrast and optionally the frequency deviation between the background and the cover.

Advantageously, the camera could have a field of view extending over 360° around a vertical axis.

The device could comprise an image generator network that is emissive within the visible and/or infrared spectrum.

Alternatively, the device could comprise an image generator network that is reflective within the visible and/or infrared spectrum.

Figure 2:
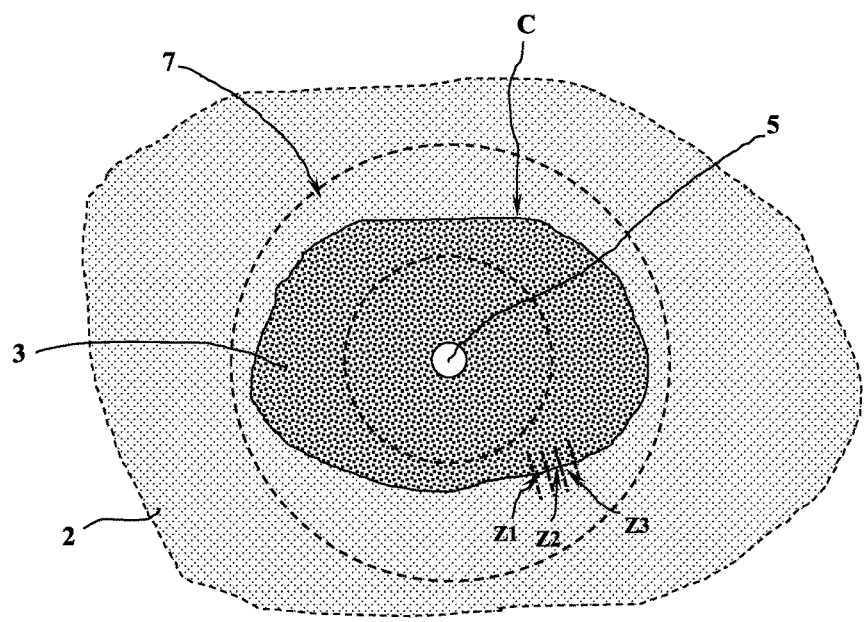
Figure 3:
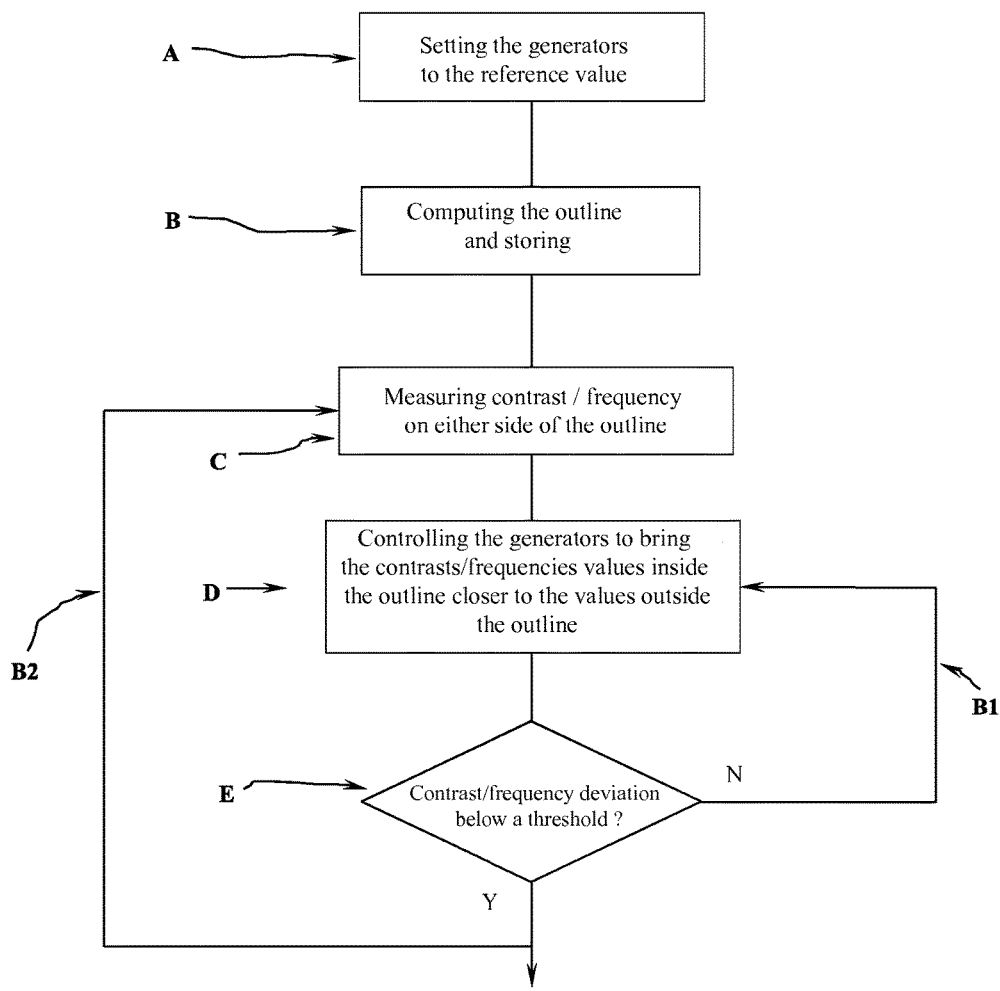
Figure 4A:
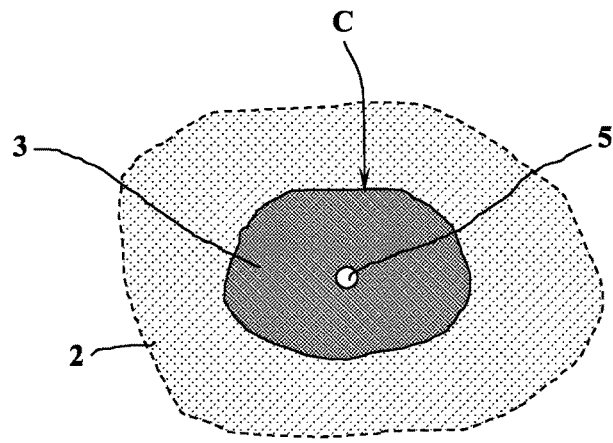
Figure 4B:
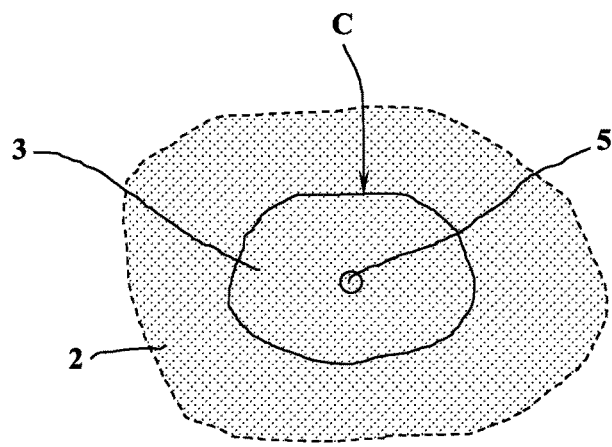
Figure 4C:
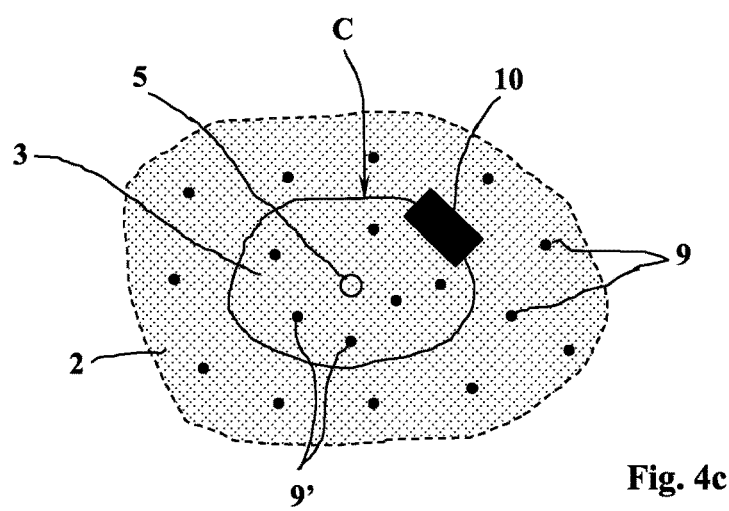

The invention will become more apparent upon reading the following description of a particular embodiment, description made with reference to the appended drawings, in which:

FIG. 1 schematically shows a side view of an element provided with a masking device according to the invention, FIG. 2 is a top view of this element, FIG. 3 is a flowchart showing the different steps of the method according to the invention, FIGS. 4a, 4b and 4c show a top view of the implementation of the method according to the invention, with the device of the invention positioned on an element.

Referring to FIGS. 1 and 2, an element 1, which is here a wheeled vehicle, is shown positioned on the ground 2 in a field of operation.

This vehicle 1 is provided with a masking device according to the invention, which comprises at least one flexible cover 3 having sizes sufficient to cover the element 1. The cover 2 is made as a multi-layer synthetic material fabric, for example a polyvinyl chloride (PVC) or polyethylene canvas, the material comprising at least one network R of image generators at one of its layers, the network being formed by a set of reflecting or emitting points (or pixels) for a given frequency of radiation, the frequency being a visible frequency (or color) or an infrared frequency. For example, a network of organic light-emitting diodes (OLEDs) could be provided on a layer of the material. This OLED technology implements printing techniques and it is particularly well adapted to the implementation of flexible emissive screens. The patent application US2012/0154196 describes, as an example, such a design of flexible cover for active masking. It is thus not necessary to describe it in more detail.

An OLED network constitutes an image generator that is emissive in the spectrum of visible frequencies.

It is also possible to define a network which is reflective in the spectrum of visible frequencies, or else reflective or emissive in the infrared spectrum.

For example, in order to constitute a network that is emissive in the infrared spectrum, it could be possible to replace the OLEDs with a network of heat generators such as elements using the Peltier effect, that is, which could be warmed or cooled when a current with a given intensity passes therethrough.

Patent applications US6927724, WO2012169954 and WO2010093323 describe, as an example, a masking device using a network of heat generators.

As an alternative, it is also possible to define an image generator network which is of the reflective type.

Such a network does not generate light, but it reflects or absorbs the light according to certain frequencies (visible or infrared). The liquid crystals used to make such reflective networks are well known in the field of electrophoretic displays and electronic inks. The patent application WO2004074911, which describes examples of materials, could be took into consideration.

It is also possible to implement the technologies of electrochromic networks which are networks that are emissive or reflective in the spectrum of infrared frequencies.

The patent application FR2969323 describes an example of multi-layer electrochromic device controllable in emission or in reflection.

The resolution of the network that will made will depend on the desired fineness for the masking. As an example, a network comprising 2000 pixels per square meter could be provided.

The generator network of the cover 3 is connected to an image synthesizer 4 coupled to a camera 5.

Obviously, the camera 5 will be chosen according to the type(s) of images generated by the network. If the cover has only one network operating in the visible spectrum, the camera will operate in the spectrum of visible frequencies. If the cover comprises a network operating in the infrared spectrum, the camera used should be able to observe in the infrared spectrum. As appropriate, it will be necessary to use several cameras, some cameras for the visible frequencies and the others for the infrared frequencies. The cameras will be so associated that the same observation field is covered for all the desired frequencies.

According to an essential feature of the invention, the camera 5 is positioned so as to cover both a portion of a background of the element (here, a part of the ground 2) and the entire cover 3.

Here, the camera 5 is mounted on a vertical pole 6 integral with the element 1. It has a field of view 7 extending over 360° around a vertical axis 8. The field of view 7 is delimited in FIGS. 1 and 2 by dotted lines.

The cameras with a field of view covering 360° are conventional cameras. They generally comprise several sensors evenly and angularly distributed around the axis 8. Now, such a camera has a relatively reduced size. It can be positioned above the cover 3 without constituting an object affecting the stealthiness of the masking that is implemented. In order to improve the masking, the housing enclosing the camera could also carry image generators connected to the image synthesizer 4.

The synthesizer 4 is an electronic housing which comprises a calculator which can analyze the images provided by the camera 5 and perform measurements on the images and, in particular, define, for different geometrical areas of the observed field, the contrast values (deviations of brightness or light intensity or thermal deviations) and, optionally, the frequencies (visible or infrared). This calculator will be provided with algorithms allowing to compare different portions of the images received, and it will also be provided with the means allowing to control the image generators of the cover 3 (whether the generators are emissive, reflecting or thermal generators).

The method according to the invention will now be described with reference to FIG. 3.

First, it is necessary that the synthesizer determines the outline of the flexible cover 3 arranged on the element 1.

To this end, during a first step A, the synthesizer will set the image generators to a reference monochromic frequency value sufficiently contrasted with respect to the background. It could control a white or black emission, for example. Such a contrasted emission has been schematized in FIG. 4a.

Thus, the camera 5, which observes both the background (ground 2) and the cover 3, clearly detects the outline C of the cover 3. The geometry of this outline C is then stored in the calculator of the synthesizer 4 (step B). This will subsequently allow the synthesizer 4 to determine, on the images which will be continuously captured by the camera 5, the (thermal or visible) frequency and contrast characteristics of the background 2 and those of the cover 3.

In a steady state, the camera 5 provides the synthesizer 4 with the images of the field 7 which is observed (FIG. 2). The calculator of the synthesizer will then measure (step C) the parameters of contrast and optionally of frequencies on either side of the stored outline C.

For the visible spectrum, the calculator will measure the color (or frequency) deviations and also the brightness deviations (contrast between the colors on either side of the outline).

For the infrared spectrum, a simple measurement of brightness deviation (thermal contrast) is generally sufficient to allow the control of the Peltier effect heat generators.

This measurement is made with a certain resolution all along the outline C and on either side of the outline C on the whole field 7. In FIG. 2, three measurement intervals Z1, Z2 and Z3 have been thus schematically shown along the outline C. Indeed, the background 2 is not necessarily identical all along the outline C. It is thus necessary to define with some accuracy the characteristics of contrasts and optionally of frequencies required for the cover 3 all along the outline C. The device according to the invention can thus ensure a masking which corresponds to the characteristics of the field. The cover can even adopt, at a portion of the outline, the contrasts and optionally the frequencies associated with a vertical background, such as a wall or a building.

The measurement resolution will be related to that allowed by the camera 5 and to the sizes of the element 1 (and to the resolution of the network R carried by the cover 3).

Then, the synthesizer 4 controls (step D) the image generators of the cover 3 such that the (visible or thermal) contrasts and optionally the (visible) frequencies at each measurement area Z1, Z2 ... Zi are, at the cover (thus within the outline C), close to the what is measured outside the outline C. This results in the masking schematized in FIG. 4b.

The synthesizer 4 thus operates in differential and the setting is controlled by a test E for measuring deviations of contrast and optionally of frequencies on either side of the outline C for each measurement area Zi. The desired values for the frequencies and contrasts are thus quickly approached, without the need to calibrate beforehand the image generators.

The feedback loop B1 causes the control to minimize the deviations (output N of the test E).

Once the deviations are minimized (output O of the test E), the loop B2 leads to a new measurement of contrast and optionally of frequency on either side of the outline. The measurements could be made with a sampling frequency from 1 measurement per minute to 1 measurement per second according to the needs for a dynamic adaptation. The masking is thus entirely adaptive and the aspect of the cover 3 follows over time the variations of brightness of the background 2.

The masking can thus be entirely operational at any hour of the day, following in particular the variations of brightness and shadows due to the displacement of the sun.

The control of contrasts and optionally of frequencies of the cover in the vicinity of the outline C has been described. Concerning the contrasts and optionally the frequencies adopted for the entire surface interior to the outline C of the cover 3, moving away from the outline, the synthesizer 4 will control the image generators of the cover so as to provide it with an aspect in contrasts and optionally in frequencies having average values taking into account what is measured for the whole background 2.

For example, the algorithm will be defined to minimize the deviations of contrast and optionally of frequency when close to the outline C, so as to lessen the differences at the edges of the cover. Furthermore, the algorithm will be defined to consider, at the rest of the cover 3, and at a distance from the outline C, average contrasts and optionally frequencies calculated from the values measured on the background 2 at higher distances from the outline C.

In FIG. 4c is shown an example of implementation, in which the cover 3 partially covers a more contrasted area (shrub or wall element). The camera detects, during its analysis, this contrasted area and the image generators of the cover 3 are controlled by the synthesizer such that they provide an image dimming the outline C and thus corresponding to that of the area 10. The synthesizer 4 will be programmed such that the image of the area 10 on the cover 3 extends on an average length of the same order as the length of this area observed outside the outline C.

In FIG. 4c, it can also be noted that the background 2 comprises more contrasted points 9. The algorithm of the synthesizer calculates the average density of these points 9 at the background 2 and controls the generators of the cover 3 such that points 9' having the same frequency (or color) are synthesized with a similar density.

Various alternatives are possible without departing from the scope of the invention. It is thus possible to define a cover comprising areas without image generators, for example at observation episcopes.

It is possible to make flexible maskings for vehicles, but also individual maskings for a combat soldier.

Finally, it is possible to define a cover comprising several networks of image generators: for example, a network active in the visible spectrum and a network active in the infrared spectrum.

The invention claimed is:

1. An adaptive masking method for an element in a field of operations, the method comprising:
    covering the element with at least one cover, the cover carrying at least one image generator network, the network being connected to an image synthesizer coupled to a camera, and
    positioning the camera so as to image both a portion of a background of the element and the entire cover,
    wherein the image synthesizer controls the at least one image generator network so as to minimize the contrast between the background and the cover.

2. The adaptive masking method according to claim 1, wherein the image synthesizer controls the at least one image generator network so as to minimize also the frequency deviation between the background and the cover.

3. The adaptive masking method according to claim 1, wherein, an outline of the cover is determined beforehand, and the image synthesizer continuously compares the contrast on either side of the outline so as to control the contrast of the images provided by the at least one image generator network within the outline to minimize the contrast between the background and the cover.

4. The adaptive masking method according to claim 3, wherein the image synthesizer controls the at least one image generator network so as to minimize also the frequency deviation between the background and the cover, by continuously comparing also the frequency on either side of the outline so as to control the frequency of the images provided by the at least one generator network within the outline.

5. The adaptive masking method according to claim 3, wherein the outline is determined when placing the cover, by setting all the image generators of the image generator network to a reference value.

6. The adaptive masking method according to claim 1, wherein the images captured by the camera and generated by the image generator network are within at least one of the visible spectrum and the infrared spectrum.

7. An adaptive masking device for an element in a field of operations, the device comprising at least one cover for covering the element, the cover carrying at least one image generator network, the network being connected to an image synthesizer coupled to a camera,
    wherein
        the camera is positioned so as to image both a portion of a background of the element and the entire cover, and
        the image synthesizer is configured to control the at least one image generator network so as to minimize the contrast between the background and the cover.

8. The adaptive masking device according to claim 7, wherein the image synthesizer is configured to control the at least one image generator network so as to minimize the frequency deviation between the background and the cover.

9. The adaptive masking device according to claim 7, wherein the camera has a field of view extending over 360° around a vertical axis.

10. The adaptive masking device according to claim 7, wherein the device comprises an image generator network that is emissive within at least one of the visible spectrum and the infrared spectrum.

11. The adaptive masking device according to claim 7, wherein the device comprises an image generator network that is reflective within at least one of the visible spectrum and the infrared spectrum.

* * * * *